July 25, 1933.  W. E. EDWARDS  1,919,420

CUTTING TOOL

Filed June 2, 1932  3 Sheets-Sheet 1

Inventor:
WILLIAM E. EDWARDS,
by
his Attorneys

July 25, 1933.  W. E. EDWARDS  1,919,420
CUTTING TOOL
Filed June 2, 1932  3 Sheets-Sheet 2
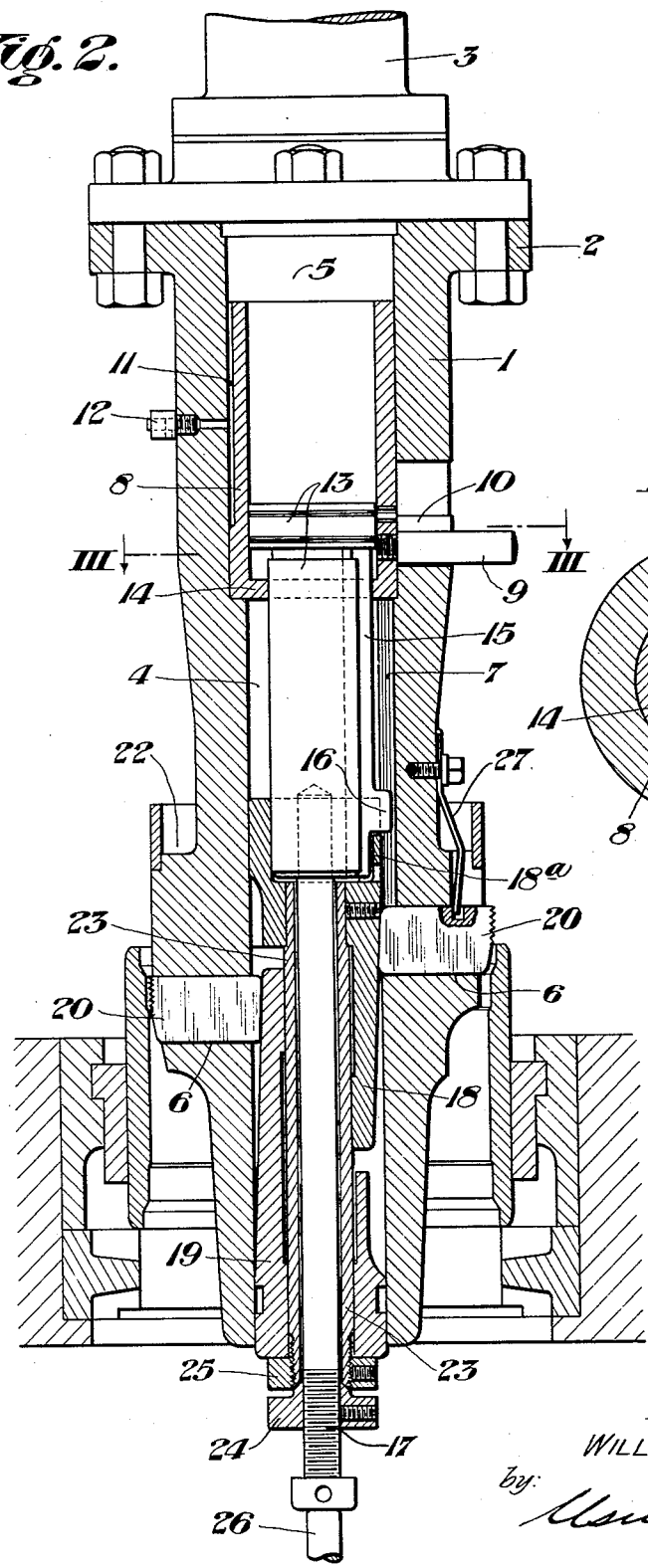
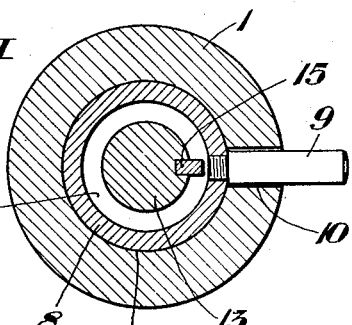
Inventor:
WILLIAM E. EDWARDS,
by
his Attorneys.

July 25, 1933.  W. E. EDWARDS  1,919,420
CUTTING TOOL
Filed June 2, 1932  3 Sheets-Sheet 3
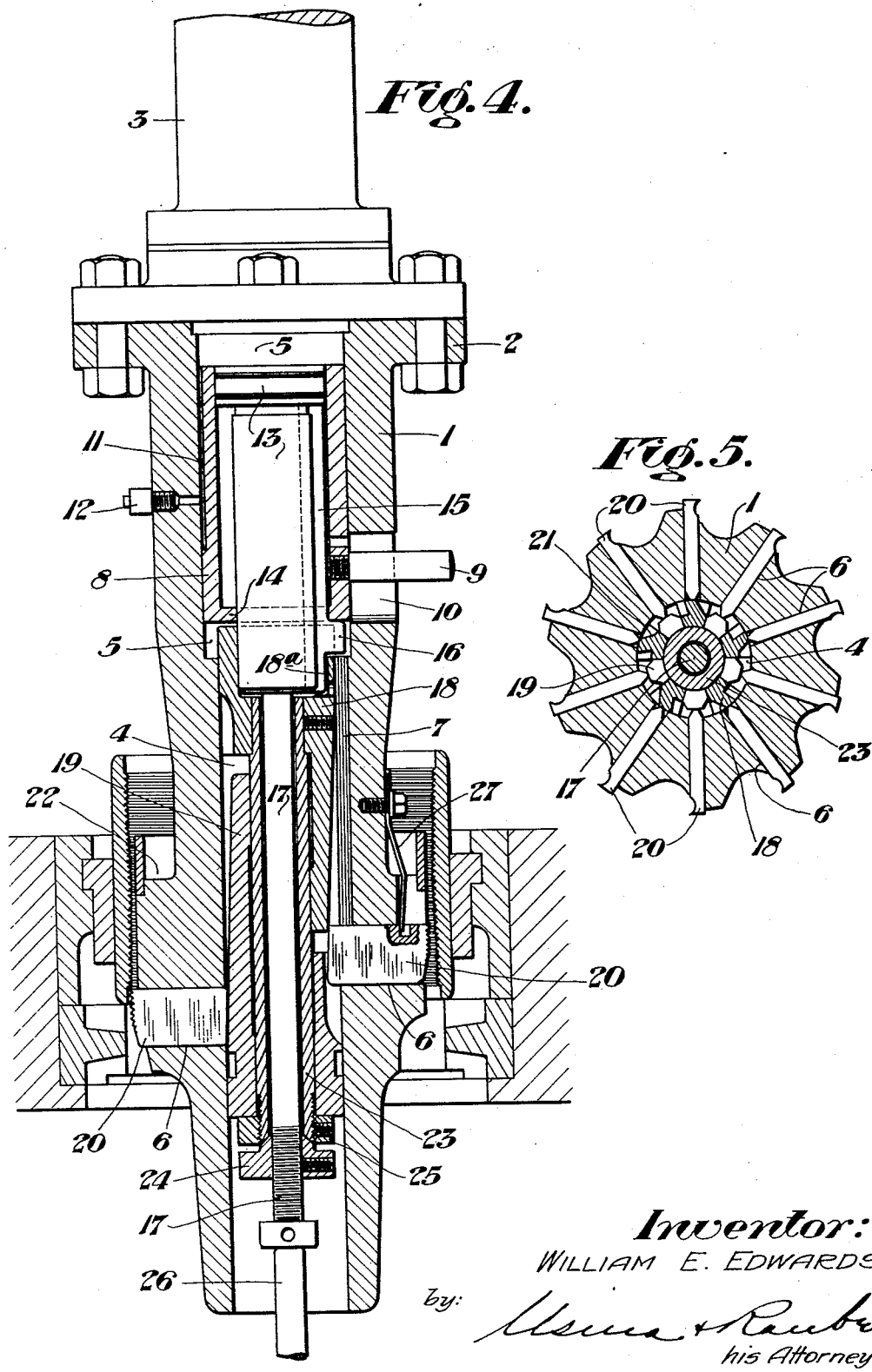
Inventor:
WILLIAM E. EDWARDS,
by: *Usina & Rauber*
his Attorneys.

Patented July 25, 1933

1,919,420

UNITED STATES PATENT OFFICE

WILLIAM E. EDWARDS, OF PITTSBURGH, PENNSYLVANIA, ASSIGNOR TO NATIONAL TUBE COMPANY, A CORPORATION OF NEW JERSEY

CUTTING TOOL

Application filed June 2, 1932. Serial No. 615,001.

This invention relates to taps which cut tapering threads in pipe couplings and the like, although it also includes features which are applicable to other types of rotary cutting tools.

It particularly relates to a tap intended to cut oppositely tapering threads in pipe couplings when given a single pass therethrough, one of the objects being to provide a tool which does this automatically. Another object is to construct this tool with a plurality of radiating cutting segments which are easily collapsed after threading an article, so that the tool may be easily withdrawn therefrom. Other objects will be understood from the following.

Having reference to the accompanying drawings which illustrate a specific form of a tool constructed in accordance with the present invention:

Figure 2 is a cross-section of Figure 1.

Figure 3 is a cross-section from the line III—III of Figure 2.

Figure 4 is the same as Figure 2 except that the drawings are in different positions.

Figure 5 is a cross-section from the line V—V of Figure 1.

Figure 1:
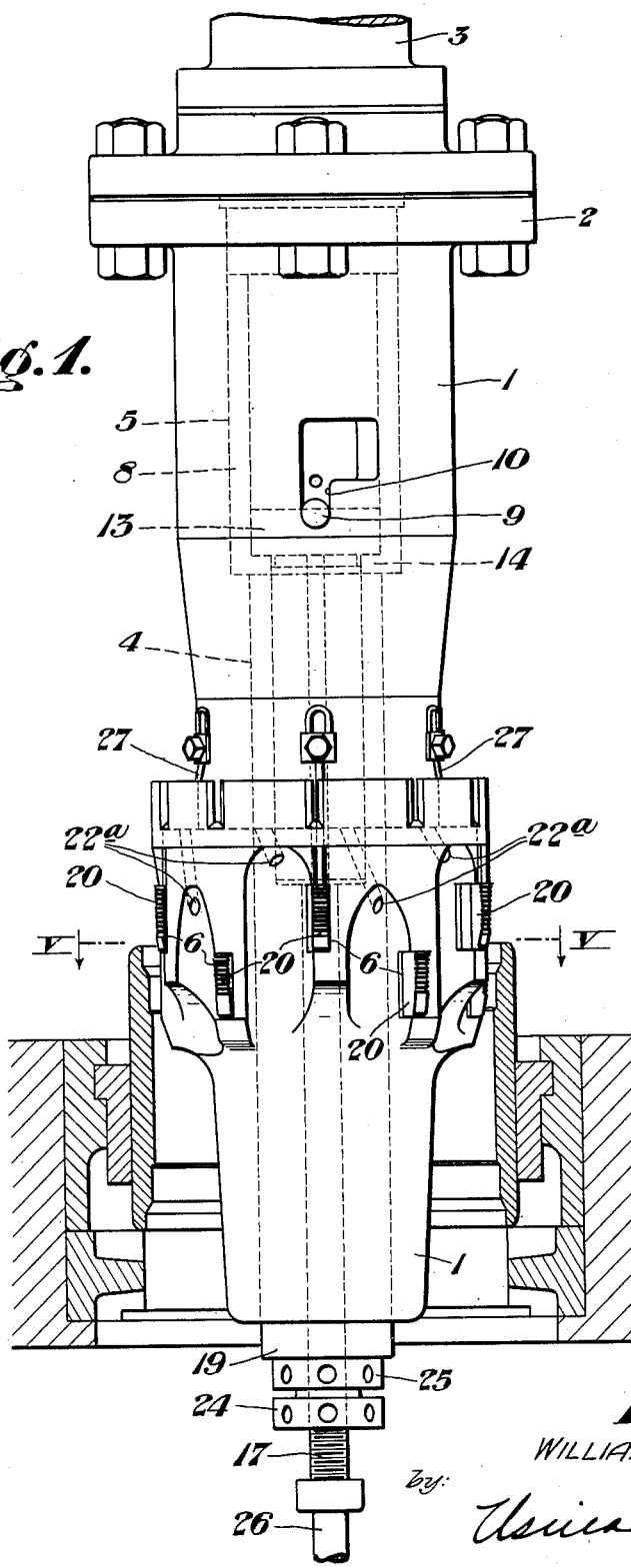
Figure 1 is a side elevation.

These drawings show an elongated body 1 having a flange 2 at its top by which it may be securely bolted to the spindle 3 of a tapping machine. This body has a longitudinal bore 4 whose upper section 5 is enlarged. Farther down it has two levels of radially arranged spaced slots 6. Its mid section is provided with a keyway 7.

A sleeve 8 is slidably arranged in the bore's enlarged section 5 and is held against turning movement by a pin 9 which projects through a slot 10 in the body 1. The upper portion of this slot is enlarged so that the pin may be swung when the sleeve 8 is raised slightly. This sleeve is provided with a longitudinal groove 11 registering with an adjustable bleeder valve 12 which thus communicates with the enlarged portion 5 of the bore 4 and with the inside of the sleeve 8.

A plunger 13 is arranged with its head in the sleeve 8, which has a flange 14 preventing separation of the two, and carries a key 15 having an upstanding lug portion 16. The flange 14 is grooved so that this key 15 can slide therein and rotatively interlock the sleeve 8 and the plunger 13. The lug 16 of the key 15 slides in the keyway 7 until it reaches the enlarged section 5 of the bore 4. When there, the sleeve 8 and the plunger 13 may be turned by the pin 9 within the limits of the enlarged portion of the slot 10.

A rod 17 is suspended from the shank of the plunger 13 and carries a pair of cams 18 and 19, the first mentioned having a slot 18$^a$ receiving the key 15. Thread cutting segments 20 are radially slidably arranged in the two levels of radial slots 6, the cams being constructed and arranged to allow the upper level of these segments to gradually recede during cutting operation and to push the lower lever progressively outwardly. By this means it is possible to cut both tapers in a coupling and, because the segments are arranged in two levels, it is possible to begin the cutting of the second taper while the upper segments are still cutting the first. This feature materially speeds coupling tapping work.

Specifically, the cam 18 is constructed with a number of spaced fingers which register with the upper level of slots 6 and have declined surfaces which contact the segments projecting therethrough. The cam 19 also has a number of fingers which register with the lower level of the slots and have inclining surfaces which contact the segments in this level. The fingers of these two cams are intermeshed and are in each instance constructed with recesses 21 arranged to receive the segments upon slight turning movement. This turning movement may be effected when the rod 17 is in its uppermost position because the lug 16 of the key 15 then engages the bottom of the sleeve 8 and lifts it upwardly so that the pin 9 may be turned into the enlarged portion of the slot 10. When this is done the lug 16 will have left the keyway 7 and will be in the enlarged section 5 of the bore 4 resting on the shoulder at its bottom, and thus holding up the sleeve 8.

When the pin 9 is moved into registration with the small portion of the slot 10 it will move the lug 16 into registration with the keyway 7 and allow all the inside members of the tap to drop into operative position, the suction in the enlarged portion 5 preventing any destructive shock. This suction may, of course, be varied by adjustment of the bleeder valve 12.

An oil reservoir 22 is arranged above the two levels of segments 20 and has ducts 22ª which lead to points adjacently above each of the cutting segments. When this reservoir is filled with oil it is possible to properly lubricate the cutting segments.

In order to vary the tapering cuts of the different segment levels the cam 18 is fixed to a sleeve 23 which projects downwardly through the cam 19 and is vertically adjustable by a nut 24. A nut 25, which is threaded on this sleeve, serves to adjust the cam 19. By this arrangement both cams' relative positions may be varied so that properly tapered threads are cut.

Before threading operation, the various parts in the bore of the body 1 are in their uppermost positions. As the tool is lowered into the article to be tapped the pin 9 is disengaged from the enlarged portion of the slot 10 so that the various inside parts drop downwardly into operating position. These parts drop gently because of the cushioning effect of the plunger 13. As the tool enters the work the lower end of the rod 17 encounters a stop 26 and is held against further longitudinal movement thereby.

The segments 20 have tapered cutting leads on their bottom portions and the article being threaded will naturally tend to thrust the lower level of these back into the recesses. The segments in the upper level are held outwardly by the cam 18 and commences to cut the threads. As the body 1 moves downwardly this upper level of segments will gradually collapse because of the shape of the cam 18, springs 27 tending to make this action more positive. As the lower level of the segments approaches the mid point of the article being threaded the cam 19 begins to force them outwardly. At the same time the upper level of the segments have receded from their cutting positions. When the cutting segments have accomplished their purpose the various parts inside the body 1 will again be at their uppermost position so that the pin 9 may be manually turned and lock the entire assembly in place.

Although a specific form of this invention has been shown and described in accordance with the patent statutes, it is not intended to limit its scope exactly thereto, except as defined by the following claims.

I claim:

1. A tool including a vertical elongated body having a longitudinal bore and radial slots opening thereinto, cutting segments radially movably arranged in said slots, a sleeve arranged in the upper part of said bore for limited vertical and turning movement, means for holding said sleeve against turning movement when at its lower position, a plunger fitting said sleeve, means for preventing said plunger dropping from said sleeve, a rod depending from said plunger, a cam on said rod constructed with surfaces which contact and radially move said segments when moved longitudinally and with recesses which receive these segments when turned, and means for preventing respective rotation of said cam and said sleeve and for raising the latter when said plunger is moved upwardly.

2. A tool including a vertical elongated body having a longitudinal bore and two levels of radially arranged spaced slots opening thereinto, cutting segments radially movably arranged in said slots, a sleeve arranged in the upper portion of said bore for limited vertical and turning movement, means for holding said sleeve against turning movement when at its lower position, a plunger fitting said sleeve, means for preventing said plunger dropping from said sleeve, a rod depending from said plunger, cams on said rod constructed with surfaces which contact and radially oppositely move the respective levels of said segments when moved longitudinally and with recesses which receive these segments when turned, and means for preventing respective rotation of said cams and said sleeve and for raising the latter when said plunger moves upwardly.

3. A tool comprising a vertical elongated body constructed with a longitudinal bore having an enlarged upper section and with two levels of radially arranged spaced slots in its lower portion opening into the lower section of this bore, cutting segments radially movably arranged through said slots, a sleeve slidably arranged in the enlarged section of said bore, a plunger fitting said sleeve, means for preventing said plunger dropping from said sleeve, a rod depending from said plunger, cams on said rod constructed with surfaces which contact and radially oppositely move the respective levels of said segments when moved longitudinally and with recesses which receive these segments when turned, means for interlocking said cams, plunger and sleeve against turning movement in said bore except when they are at their uppermost positions in the latter and constructed to lock the same against vertical movement when turned, and means for turning said sleeve.

4. A tool including a vertical elongated body having a longitudinal bore and two levels of radiating spaced slots opening thereinto, cutting segments arranged in said slots for radial movement respecting said body, a rod arranged in the bore of said body for limited vertical movement and so its lower end projects therefrom when it is in its lowermost position, a sleeve slidably fitting said rod to a point adjacent its lower end, a cam member for said segments in the upper level of said slots and fixedly carried by said sleeve, a cam member for said segments in the lower level of said slots slidably carried by said sleeve and non-rotatively and slidingly engaging said first named cam member, a nut screw-threaded on said rod and engaging said sleeve, and another nut screw-threaded on said sleeve and engaging said second named cam member.

WILLIAM E. EDWARDS.